US011157049B2

(12) United States Patent
Zhai et al.

(10) Patent No.: US 11,157,049 B2
(45) Date of Patent: Oct. 26, 2021

(54) STORAGE DRIVE CARRIER AND CHASSIS

(71) Applicant: EMC IP Holding Company LLC, Hopkinton, MA (US)

(72) Inventors: Haifang Zhai, Shanghai (CN); Yujie Zhou, Shanghai (CN); Xiaoping Wu, Shanghai (CN); Wei Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/835,743

(22) Filed: Mar. 31, 2020

(65) Prior Publication Data

US 2020/0348735 A1 Nov. 5, 2020

(30) Foreign Application Priority Data

Apr. 30, 2019 (CN) .......................... 201910364319.5

(51) Int. Cl.
*G06F 1/18* (2006.01)
*G11B 33/04* (2006.01)

(52) U.S. Cl.
CPC .............. *G06F 1/187* (2013.01); *G11B 33/04* (2013.01)

(58) Field of Classification Search
CPC ..... G11B 33/127; G11B 33/128; G11B 33/04; G11B 33/12; G06F 1/16; G06F 1/181
See application file for complete search history.

(56) References Cited

U.S. PATENT DOCUMENTS

| 7,068,500 | B1 | 6/2006 | Beinor, Jr. et al. | |
| 7,190,575 | B1* | 3/2007 | Baik | G06F 1/187 |
| | | | | 248/682 |
| 7,216,188 | B2 | 5/2007 | Reid et al. | |
| 7,698,491 | B1 | 4/2010 | King, Jr. et al. | |
| 8,032,785 | B1 | 10/2011 | Brown et al. | |
| 10,194,554 | B2 | 1/2019 | Zhou et al. | |
| 2009/0273896 | A1* | 11/2009 | Walker | G06F 1/187 |
| | | | | 361/679.33 |

* cited by examiner

*Primary Examiner* — James Wu
(74) *Attorney, Agent, or Firm* — BainwoodHuang (57) ABSTRACT

Techniques provide for a storage drive carrier. The carrier may include a body configured to receive a storage drive, the body having a first length in a first direction, a second length in a second direction, and a third length in a third direction. The third length is below the first length, the first length is below the second length, and the first direction, the second direction, and the third direction are perpendicular to one another. The storage drive carrier may further include a protrusion configured to receive a first circuit board for transmitting data, the protrusion being arranged together with the body in the third direction. The protrusion is positioned within an area delimited by a center line of a face of the body on which the protrusion is provided and sides of the face, the center line bisecting the face and being parallel with the second direction.

11 Claims, 6 Drawing Sheets

STORAGE DRIVE CARRIER AND CHASSIS

CROSS REFERENCE TO RELATED APPLICATION

This application claims priority to Chinese Patent Application No. CN201910364319.5, on file at the China National Intellectual Property Administration (CNIPA), having a filing date of Apr. 30, 2019, and having "STORAGE DRIVE CARRIER AND CHASSIS" as a title, the contents and teachings of which are herein incorporated by reference in their entirety.

FIELD

Embodiments of the present disclosure generally relate to the field of storage, and more specifically, to a storage drive carrier and a chassis including the storage drive carrier.

BACKGROUND

The storage drive carrier is usually mounted in the chassis. Such devices may receive, storage devices, memory modules, and the like, for example, at least a portion of a storage systems, a multi-blade server systems, or other types of information processing systems. The chassis usually has a standard length, width, and height, for example, a height of 1U, 2U, 3U, 4U, and the like, where U represents a unit height of 1.75" (1.75 inches) according to the EIA-310-D industry standard. The currently urgent and yet to be solved problem in the art is how to accommodate or receive more various types of storage drives within the chassis, especially how to place more storage drive carriers by reasonably utilizing the height of the chassis.

SUMMARY

In general, embodiments of the present disclosure provide a storage drive carrier and a chassis including the storage drive carrier.

In a first aspect of the present disclosure, there is provided a storage drive carrier. The storage drive carrier may include a body configured to receive a storage drive, the body having a first length in a first direction, a second length in a second direction, and a third length in a third direction. The third length is below the first length, the first length is below the second length, and the first direction, the second direction, and the third direction are perpendicular to one another. The storage drive carrier may further include a protrusion configured to receive a first circuit board for transmitting data, the protrusion being arranged together with the body in the third direction. In addition, the protrusion is positioned within an area delimited by a center line of a face of the body on which the protrusion is provided and sides of the face, the center line bisecting the face and being parallel with the second direction.

In some embodiments, the first circuit board may include a first interface configured to transmit the data.

In some embodiments, the first interface may be configured to plug, in the second direction, to a backplate of a chassis for receiving the storage drive carrier.

In some embodiments, there is further comprised a second circuit board disposed below the first circuit board and supplying power, wherein the second circuit board includes a second interface configured to transfer power.

In some embodiments, the second interface is configured to plug, in the second direction, to a backplate of a chassis for receiving the storage drive carrier.

In some embodiments, the second interface is configured to connect to the first interface to supply power for the first circuit board.

In some embodiments, the body further includes an intermediate connector, through which the first interface is connected to the storage drive.

In some embodiments, the storage drive is a 3.5" storage drive.

In some embodiments, the storage drive carrier is configured to be superimposed with an additional storage drive carrier, the protrusion of the storage drive carrier facing other area of the additional storage drive carrier except for an area provided with an additional protrusion.

In a second aspect of the present disclosure, there is provided a chassis. The chassis includes the above at least two storage drive carriers, a further storage drive carrier and a shell. A protrusion of one storage drive carrier in the at least two storage drive carriers faces other area of an additional storage drive carrier in the at least two storage drive carriers except for an area provided with an additional protrusion. Besides, the two storage drive carriers are superimposed together in a centrosymmetric way. Furthermore, the further storage drive carrier is superimposed, in the third direction, near these two storage drive carriers and the further storage drive carrier is configured to receive another storage drive having a different type than storage drives received in these two storage drive carriers. The shell may be configured to receive the two storage drive carriers and the further storage drive carrier.

In a third aspect of the present disclosure, there is provided a method for manufacturing the above storage drive carrier.

Through the following illustration of the example embodiments with reference to the drawings, features of the present disclosure become more apparent. It should be appreciated that the Summary is not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

Same or similar reference signs are used to indicate same or similar elements throughout the drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure are now explained with reference to various example embodiments shown in the drawings. It should be appreciated that description of those embodiments is merely to enable those skilled in the art to better understand and further implement the present disclosure and is not intended for limiting the scope disclosed herein in any manner. It should be noted that similar or same reference signs can be used in the drawings where feasible, and similar or same reference signs can represent similar or same functions. Those skilled in the art should understand from the following description that alternative embodiments of the structure and the method described in the text can be adopted without deviating from the principles of the present invention described herein.

Figure 1A:
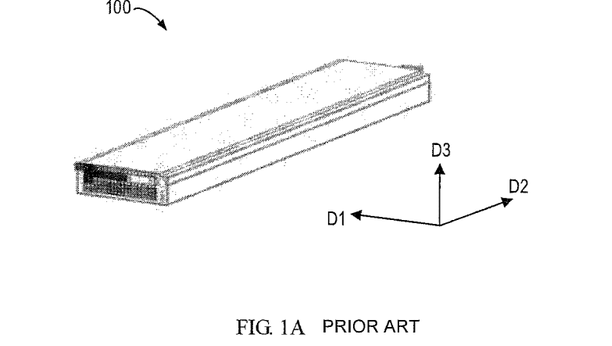
FIG. 1A schematically illustrates a perspective view of a traditional storage drive carrier.

As briefly described above, a currently urgent and yet to be solved problem is how the height of the chassis is reasonably utilized to place more storage drive carriers. FIG. 1A schematically illustrates a perspective view of a traditional storage drive carrier 100. To facilitate the following detailed description, the width direction (indicated by D1, also known as "first direction"), the length direction (indicated by D2, also known as "second direction"), and the height direction (indicated by D3, also known as "third direction") of the storage drive carrier 100 are defined in FIG. 1A. An internal structure of the traditional storage drive carrier 100 will be shown in FIG. 1B.

Figure 1B:
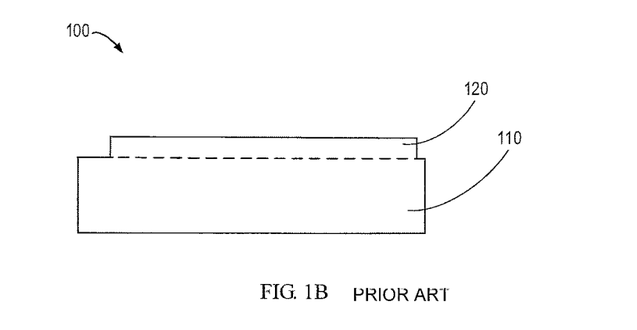
FIG. 1B schematically illustrates a cross-section view of the traditional storage drive carrier 100 perpendicular to the second direction (D2)

FIG. 1B schematically illustrates a cross-section view of the traditional storage drive carrier 100 perpendicular to the second direction D2. As shown in FIG. 1B, the storage drive carrier 100 may include a body 110 for receiving a storage drive and a protrusion 120 for receiving a circuit board like PCB. The circuit board is electrically connected with the storage drive for implementing data and power transmission with the storage drive.

Figure 1C:
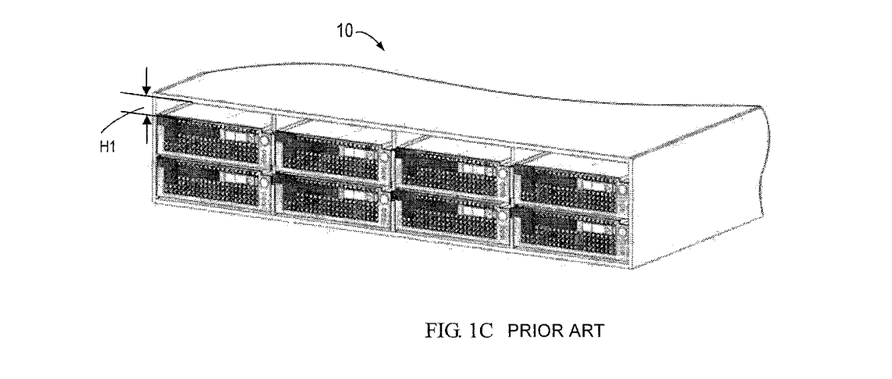
FIG. 1C schematically illustrates a local perspective view of a chassis including the traditional storage drive carrier.

FIG. 1C further schematically illustrates a local perspective view of a chassis 10 including the traditional storage drive carrier 100. As shown in FIG. 1C, 8 or any number of storage drive carriers are stored in the chassis 10, and each of storage drive carriers is plugged to a backplate of the chassis 10 in the second direction D2 to implement data and power transmission. Specifically, in FIG. 1B, at the end of the storage drive carrier 100 that enters the sheet, the protrusion 120 is provided with one or more interfaces. The one or more interfaces are laterally provided, some of which are used for transmitting data while the other are used for transferring power to supply power for the circuit board and the storage drive. In other words, the circuit board and the interface for transmitting data and power are disposed on a face of the storage drive carrier 100 perpendicular to the third direction D3.

Remaining space usually exists in the third direction D3 with a height of H1. For example, when the standard height of the chassis 10 is 2U and the storage drive therein is a 3.5" hard disk, the available height of the chassis 10 is approximately 80 mm, and a sum of height when two layers of 3.5" hard disks are superimposed is about 64 mm. Therefore, the height H1 of the remaining space is approximately 14 mm. Unfortunately, the height of the 2.5" hard disk is slightly greater than 14 mm. Considering the actual thickness of the metal shell, the height for receiving the 2.5" hard disk is around 17 mm. Therefore, the height H1 of the remaining space of the chassis 10 in the third direction D3 cannot be used for inserting other hard disks, which results in wasted space. Similar situations also occur with other sizes of storage drive carriers and chassis. Therefore, the present disclosure is aimed to redesign the structure of the storage drive carrier and the way in which the storage drive carriers are superimposed in the chassis, so as to arrange the storage drive carrier more efficiently and reduce the possibility of space waste.

It should be understood that "storage drive" in the present disclosure can refer to storage apparatuses (e.g., hard disk and the like) implemented in the electronic device, such as 3.5" hard disk for storing cold data or 2.5" hard disk for storing hot data etc. It should be appreciated that "storage drive" is not restricted the above listed storage apparatuses and other various types of electronic devices stored in the chassis can be expected.

The redesigned structure of the storage drive carrier and the way in which the storage drive carriers are superimposed in the chassis will be described in details below with reference to the rest drawings.

Figure 2A:
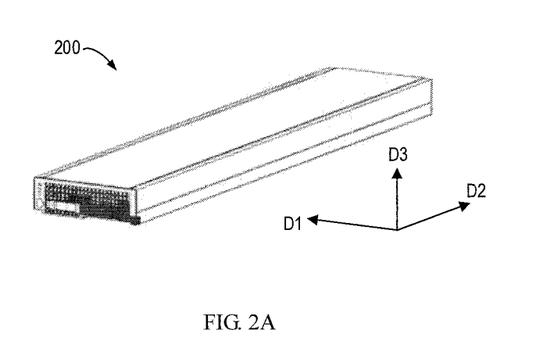
FIG. 2A schematically illustrates a perspective view of a storage drive carrier in accordance with embodiments of the present disclosure.
Figure 2B:
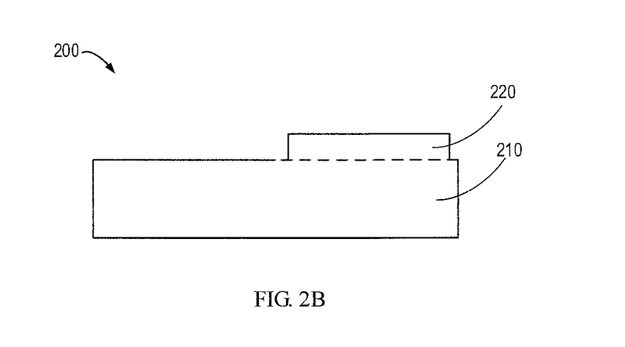
FIG. 2B schematically illustrates a cross-section view of the storage drive carrier perpendicular to the second direction (D2) in accordance with embodiments of the present disclosure.

FIG. 2A schematically illustrates a perspective view of a storage drive carrier 200 in accordance with embodiments of the present disclosure. It can be seen from FIG. 2A that a lower surface of the storage drive carrier 200 is not as flat as the storage drive carrier 100 in FIG. 1A and has a protrusion instead. FIG. 2B schematically illustrates a cross-section view of the storage drive carrier 200 perpendicular to the second direction D2 in accordance with embodiments of the present disclosure. To facilitate the demonstration, the section of FIG. 2B is reversed 180 degrees relative FIG. 2A. As shown in FIG. 2B, the storage drive carrier 200 may include a body 210 and a protrusion 220. As an example, the protrusion 120 is positioned above the body 110. As another example, the protrusion 120 also can be positioned above the body 110.

Similar to FIG. 1B, the body 210 is used for receiving the storage drive while the protrusion 120 is used for receiving the circuit board like PCB. As an example, the storage drive carrier 200 may include the body 210. As shown in FIG. 2A, the body 210 has a first length in the first direction D1, a second length in the second direction D2, and a third length in the third direction D3. For example, the third length may be below the first length, the first length may be further below the second length, and the first direction D1, the second direction D2, and the third direction D3 are perpendicular to one another. Moreover, the storage drive carrier 200 may also include the protrusion 220.

As described above, the circuit board of the traditional storage drive carrier 100 and the interface for transmitting data and power in FIG. 1B are disposed on a face of the storage drive carrier 100 perpendicular to the third direction D3. Different from FIG. 1B, the protrusion 220 of the storage drive carrier 200 including the circuit board in FIG. 2B is disposed at one side of a face of the storage drive carrier 200 perpendicular to the third direction D3, and the length of the protrusion 220 in the first direction D1 is below half of the length of the storage drive carrier 200 in the first direction D1. It should be understood that the specific shape of the storage drive carrier 200 shown in FIGS. 2A and 2B does not constitute the restrictions over the scope of the present disclosure and the storage drive carrier 200 may also be implemented in various suitable forms.

Figure 3:
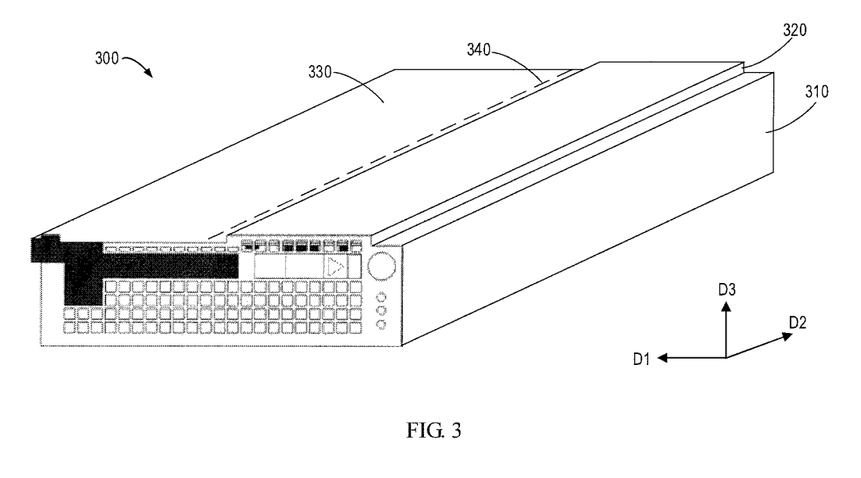
FIG. 3 schematically illustrates a perspective view of a storage drive carrier in accordance with embodiments of the present disclosure.

FIG. 3 illustrates, in more details, a perspective view of a storage drive carrier 300 in accordance with embodiments of the present disclosure. As shown in FIG. 3, the storage drive carrier 300 may include a body 310. The body 310 has a first length in the first direction D1, a second length in the second direction D2, and a third length in the third direction D3. As an example, the third length may be below the first length, and the first length may be further below the second length. The first direction D1, the second direction D2, and the third direction D3 are perpendicular to one another. Moreover, the storage drive carrier 300 may further include a protrusion 320.

In some embodiments, the protrusion 320 is arranged together with the body 310 in the third direction D3. As shown in FIG. 3, the protrusion 320 may be positioned within an area delimited by a center line 340 of a face 330 of the body 310 on which the protrusion 320 is provided and sides of the face 330. It should be appreciated that the center line 340 is usually interpreted to bisect the face 330 and to be parallel with the second direction D2. In other words, if the face 330 of the body 310 is divided, along the second direction D2, into two equal parts, the protrusion 320 will be disposed on one of the equal parts according to FIG. 3. A detailed implementation of reducing the length of the protrusion 320 in the first direction D1 will be described in details below.

Figure 4A:
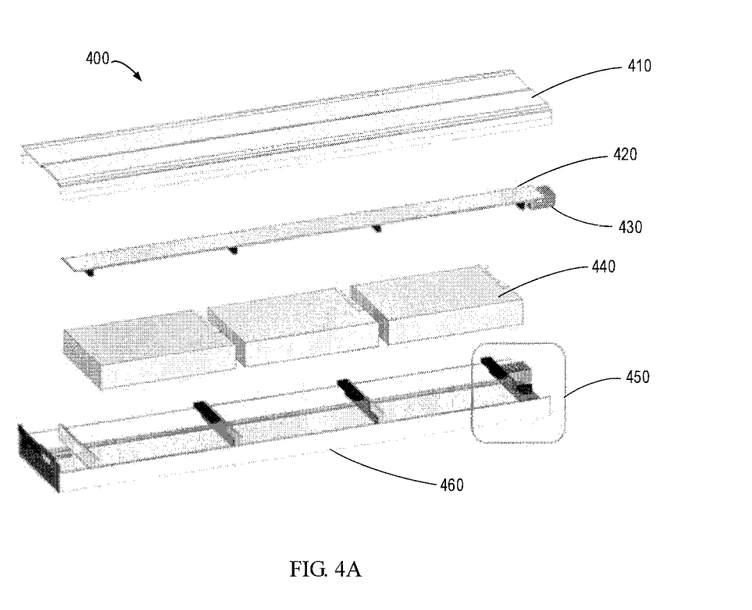
FIG. 4A schematically illustrates an explosive view of a storage drive carrier in accordance with embodiments of the present disclosure.

FIG. 4A schematically illustrates an explosive view of a storage drive carrier 400 in accordance with embodiments of the present disclosure. As shown in FIG. 4A, the storage drive carrier 400 is decomposed, from top to bottom, into a top shell 410, a first circuit board 420 for transmitting data, a storage drive 440, and a bottom shell 460. As described above, the circuit board and the interface for transmitting data and power of the traditional storage drive carrier 100 of FIG. 1B are disposed on a face of the storage drive carrier 100 perpendicular to the third direction D3. Different from FIG. 1B, the first circuit board 420 of the storage drive carrier 400 of FIG. 4A is arranged at one side of a face of the storage drive carrier 400 perpendicular to the third direction D3, and the length of the first circuit board 420 in the first direction D1 is below half of the length of the storage drive carrier 400 in the first direction D1. In other words, the first circuit board 420 is designed to be narrower in the first direction D1 than other directions.

Furthermore, the first circuit board 420 includes a first interface 430 as shown in FIG. 4A. In some embodiments, the first interface 430 may be configured to plug, in the second direction D2, to the backplate of the chassis 10 for receiving the storage drive carrier. As described above, the traditional storage drive carrier 100 includes one or more interfaces laterally arranged on the face 330 and these interfaces are used for data and power transmission to supply power for the circuit board and the storage drive. The difference from the traditional storage drive carrier 100 of FIG. 1B is that, the number of interfaces of the storage drive carrier 400 in FIG. 4A is reduced, in addition to reducing the length of the first circuit board 420 in the first direction D1. As an example, the first interface 430 may be remained only at the end of the first circuit board 420 while the additional interface 450 is arranged at the body below the first interface 430.

Figure 4B:
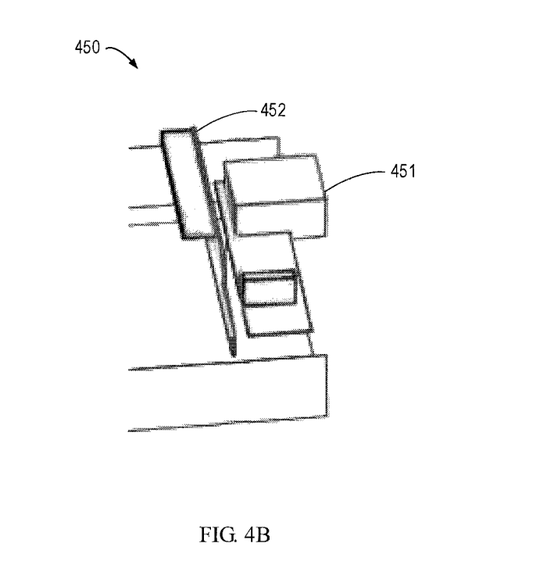
FIG. 4B schematically illustrates a local perspective view of an additional interface 450 at the end of the storage drive carrier in FIG. 4A.

FIG. 4B schematically illustrates a local perspective view of an additional interface 450 at the end of the storage drive carrier 400 in FIG. 4A. As shown in FIG. 4B, the additional interface 450 includes a second interface 451 and an intermediate connector 452. The second interface 451 is configured to be plugged, in the second direction D2, to the backplate of the chassis 10 for receiving the storage drive carrier 400 to transfer power. It should be understood that although not shown, the body of the storage drive carrier 400 should also include a second circuit board for supplying power, and the second interface 451 operates on the second circuit board. Alternatively or additionally, the second circuit board for supplying power may also be superimposed with the first circuit board 420 and arranged together in the protrusion. As the second circuit board for supplying power has a relatively simple structure, it is only required to sacrifice the thickness of 2 to 5 layers (e.g., 4 layers) of circuit boards.

In some embodiments, the second interface 451 is configured to connect to the first interface 430 to facilitate supplying power for the first circuit board 420. As an example, the first interface 430 may further be connected, via the intermediate connector 452, to the storage drive 440 to implement functions of data transmission and power supply of the storage drive 440. Preferably, the first interface 430 and the second interface 451 may be combined and jointly plugged to the backplate of the chassis 10.

Accordingly, the protrusion 220 (FIG. 2B) and 320 (FIG. 3) with narrowed width is implemented by transforming a redundant length of the protrusion 120 of the traditional storage drive carrier 100 in the first direction D1 into the slightly increased length in the second direction D2 or in the third direction D3.

Figure 5:
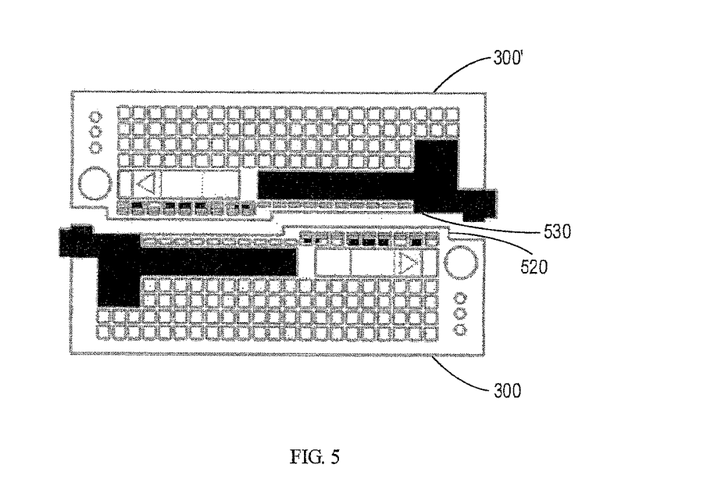
FIG. 5 schematically illustrates a cross-section view of two storage drive carriers perpendicular to the second direction (D2) in accordance with embodiments of the present disclosure.

FIG. 5 schematically illustrates a cross-section view of two storage drive carriers 300 and 300' perpendicular to the second direction D2 in accordance with embodiments of the present disclosure. As shown in FIG. 5, the storage drive carrier 300 are superimposed with the additional storage drive carrier 300' in a centrosymmetric way. Specifically, the protrusion 520 of the storage drive carrier 300 faces other areas 530 of the additional storage drive carrier 300' except for the area provided with an additional protrusion. Besides, although not demonstrated with reference signs, it should be appreciated that the protrusion of the additional storage drive carrier 300' also faces other areas of the storage drive carrier 300 except for the area provided with an additional protrusion. Since the protrusion is redesigned to be positioned at one side of the body and the length of the protrusion in the first direction D1 is below half of the length of the body in the first direction D1, the two storage drive carriers 300 and 300' may be stacked together. In this way, every time two storage drive carriers are superimposed, approximately the thickness of one protrusion in the third direction D3 may be saved. Taking the standard height of the chassis as 2U and the storage drive as a 3.5" hard disk as an example, the two superimposed storage drive carriers 300 and 300' may also be stacked with a carrier for receiving a 2.5" hard disk. Details are explained below with reference to FIG. 6.

Figure 6:
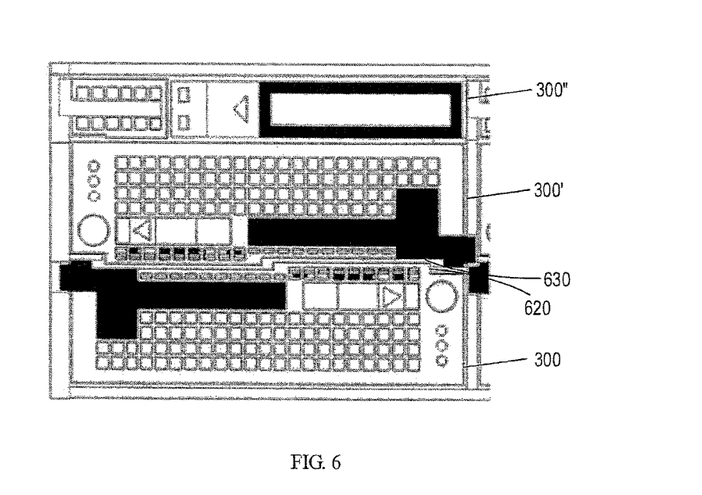
FIG. 6 schematically illustrates a cross-section view of three storage drive carriers perpendicular to the second direction (D2) in accordance with embodiments of the present disclosure.

FIG. 6 schematically illustrates a cross-section view of three storage drive carriers 300, 300', and 300" perpendicular to the second direction D2 in accordance with embodiments of the present disclosure. As shown in FIG. 6, a further storage drive carrier 300" is superimposed on the two superimposed storage drive carriers 300 and 300'. Similar to FIG. 5, the protrusion 620 of the storage drive carrier 300 in FIG. 6 faces other area 630 of the additional storage drive carrier 300' except for the area provided with the additional protrusion. Although not demonstrated with reference signs, it should be understood that the protrusion of the additional storage drive carrier 300' also faces other area of the storage drive carrier 300 except for the area provided with the additional protrusion. In addition, the further storage drive carrier 300' is configured to receive a further storage drive having a different type than those received in the two storage drive carriers 300 and 300'. As an example, the two storage drive carriers 300 and 300' are configured to receive the 3.5" storage drive while the further storage drive carrier 300" is configured to receive the 2.5" storage drive.

Figure 7:
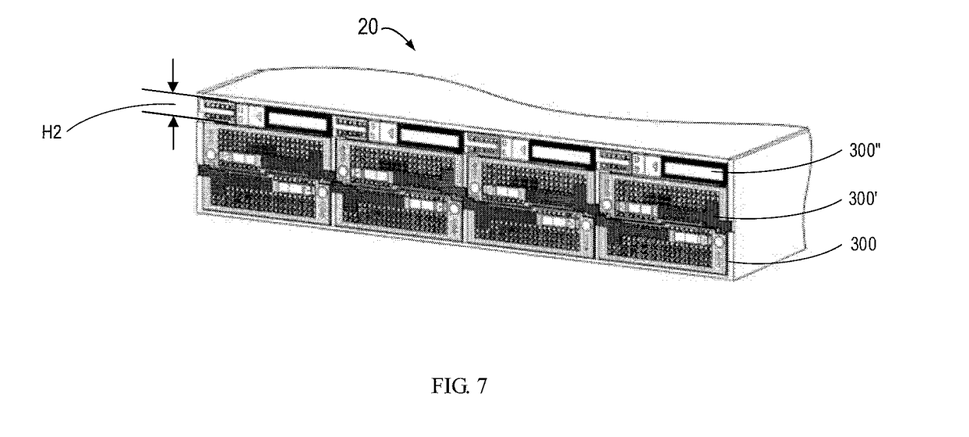
FIG. 7 schematically illustrates a local perspective view of the chassis in accordance with embodiments of the present disclosure.

FIG. 7 schematically illustrates a local perspective view of the chassis 20 in accordance with embodiments of the present disclosure. As shown in FIG. 7, the chassis 20 includes two storage drive carriers 300 and 300'. As the two storage drive carriers 300 and 300' are stacked in such a manner as to be engaged with each other, the height H2 of the remaining space in the third direction D3 is greater than the height H1 (see FIG. 1C) of the traditionally arranged remaining space. Therefore, the remaining space may further receive the storage drive carrier 300'. As an example, the chassis 20 may have a standard chassis height of 2U and the two storage drive carriers 300 and 300' are configured to receive the 3.5" storage drive, while the further storage drive carrier 300" is configured to receive the 2.5" storage drive.

Furthermore, it should be understood that the chassis 20 further includes a shell for enclosing the storage drive carriers 300, 300' and 300".

According to the above description, the present disclosure also provides a method for manufacturing the above storage drive carrier.

It should be appreciated that the example explanation and illustration of the specific shapes of the storage drive carrier do not constitute limitations over the composition and the structure of the present disclosure. Based on the teaching of the present disclosure, other shapes of storage drive carriers would be easily contemplated, simply by forming the protrusions for mutual engagement.

From the above description, protrusions for mutual engagement are constructed by shortening the circuit board within the storage drive carrier in the first direction D1, thereby saving the height of the storage drive carrier in the third direction D3. Thus, the chassis of the present disclosure may receive more storage drive carriers, so as to arrange the storage drive carriers more efficiently and meanwhile bring the advantages of lowering the possibility of space waste. Besides, to facilitate the production, the storage drive carrier 300 and the additional storage drive carrier 300' described in the present disclosure have a completely identical shape.

It should be appreciated the above detailed embodiments of the present disclosure are provided only for illustrating or explaining the principles of the present disclosure by examples rather than restricting the present disclosure. Therefore, any amendments, equivalent substitutions, improvements and the like, as long as they are within the spirit and the scope of the present invention, should be included within the protection scope of the present invention. The present disclosure can more efficiently arrange the storage drive carriers and simultaneously lower the possibility of space waste.

We claim:

1. A storage drive carrier, comprising:
a body configured to receive a storage drive, the body having a first length in a first direction, a second length in a second direction, and a third length in a third direction, the third length being less than the first length, the first length being less than the second length, and the first direction, the second direction, and the third direction being perpendicular to one another; and
a protrusion configured to receive both a first circuit board for transmitting data and an additional second circuit board for supplying power, the protrusion being arranged together with the body in the third direction, wherein the first circuit board includes a first interface configured to transmit the data, wherein the first circuit board is arranged at a side of the storage drive carrier perpendicular to the third direction, wherein a length of the first circuit board is less than half the length of the storage drive carrier in the first direction, and wherein the second circuit board is superimposed over the first circuit board and arranged together with the first circuit board within the protrusion;
wherein the protrusion is positioned within an area delimited by a center line of a face of the body and sides of the face, the protrusion is provided on the face, and wherein the center line bisects the face and is parallel with the second direction.

2. The storage drive carrier according to claim 1, wherein the first interface is configured to plug, in the second direction, to a backplate of a chassis for receiving the storage drive carrier.

3. The storage drive carrier according to claim 1, wherein the second circuit board includes a second interface configured to transfer power.

4. The storage drive carrier according to claim 3, wherein the second interface is configured to plug, in the second direction, to a backplate of a chassis for receiving the storage drive carrier.

5. The storage drive carrier according to claim 3, wherein the second interface is configured to connect to the first interface to supply power for the first circuit board.

6. The storage drive carrier according to claim 1, wherein the body further comprises an intermediate connector, and the first interface is connected to the storage drive via the intermediate connector.

7. The storage drive carrier according to claim 1, wherein the storage drive is a 3.5" storage drive.

8. The storage drive carrier according to claim 1, wherein the storage drive carrier is configured to be stacked with an additional storage drive carrier, the protrusion of the storage drive carrier facing another area of the additional storage drive carrier except for an area provided with an additional protrusion.

9. A chassis comprising:
multiple storage drive carriers, each storage drive carrier including:
a body configured to receive a storage drive, the body having a first length in a first direction, a second length in a second direction, and a third length in a third direction, the third length being less than the first length, the first length being less than the second length, and the first direction, the second direction, and the third direction being perpendicular to one another, and
a protrusion configured to receive both a first circuit board for transmitting data and an additional second circuit board for supplying power, the protrusion being arranged together with the body in the third direction, wherein the first circuit board includes a first interface configured to transmit the data, wherein the first circuit board is arranged at a side of the storage drive carrier perpendicular to the third direction, wherein a length of the first circuit board is less than half the length of the storage drive carrier in the first direction, and wherein the second circuit board is superimposed over the first circuit board and arranged together with the first circuit board within the protrusion,
wherein the protrusion is positioned within an area delimited by a center line of a face of the body and sides of the face, the protrusion is provided on the face, and wherein the center line bisects the face and is parallel with the second direction;
wherein a first storage drive carrier is configured to be stacked with a second storage drive carrier, the protrusion of the first storage drive carrier facing another area of the second storage drive carrier except for an area provided with an additional protrusion;
wherein the chassis further comprises:
a third storage drive carrier stacked, in the third direction, near the first and second storage drive carriers, wherein the third storage drive carrier is configured to receive a third storage drive having a different type than storage drives received in the first and second storage drive carriers; and
a shell configured to receive the first and second storage drive carriers and the third storage drive carrier.

10. The chassis according to claim 9, wherein the at least two storage drive carriers are configured to receive a 3.5" storage drive while the further storage drive carrier is configured to receive a 2.5" storage drive, and the chassis has a standard chassis height of 2U.

11. A method for manufacturing a storage drive carrier, the method comprising:
providing a body configured to receive a storage drive, the body having a first length in a first direction, a second length in a second direction, and a third length in a third direction, the third length being less than the first length, the first length being less than the second length, and the first direction, the second direction, and the third direction being perpendicular to one another; and
configuring the body with a protrusion to receive both a first circuit board for transmitting data and an additional second circuit board for supplying power, the protrusion being arranged together with the body in the third direction, wherein the first circuit board includes a first interface configured to transmit the data, wherein the first circuit board is arranged at a side of the storage drive carrier perpendicular to the third direction, wherein a length of the first circuit board is less than half the length of the storage drive carrier in the first direction, and wherein the second circuit board is superimposed over the first circuit board and arranged together with the first circuit board within the protrusion;
wherein the protrusion is positioned within an area delimited by a center line of a face of the body and sides of the face, the protrusion is provided on the face, and wherein the center line bisects the face and is parallel with the second direction.

* * * * *